June 3, 1930.  W. S. BARKER  1,760,894
AGRICULTURAL IMPLEMENT
Filed Feb. 29, 1928  2 Sheets-Sheet 1

Inventor
W. S. Barker.
By Lacey & Lacey, Attorneys.

June 3, 1930.  W. S. BARKER  1,760,894
AGRICULTURAL IMPLEMENT
Filed Feb. 29, 1928  2 Sheets-Sheet 2
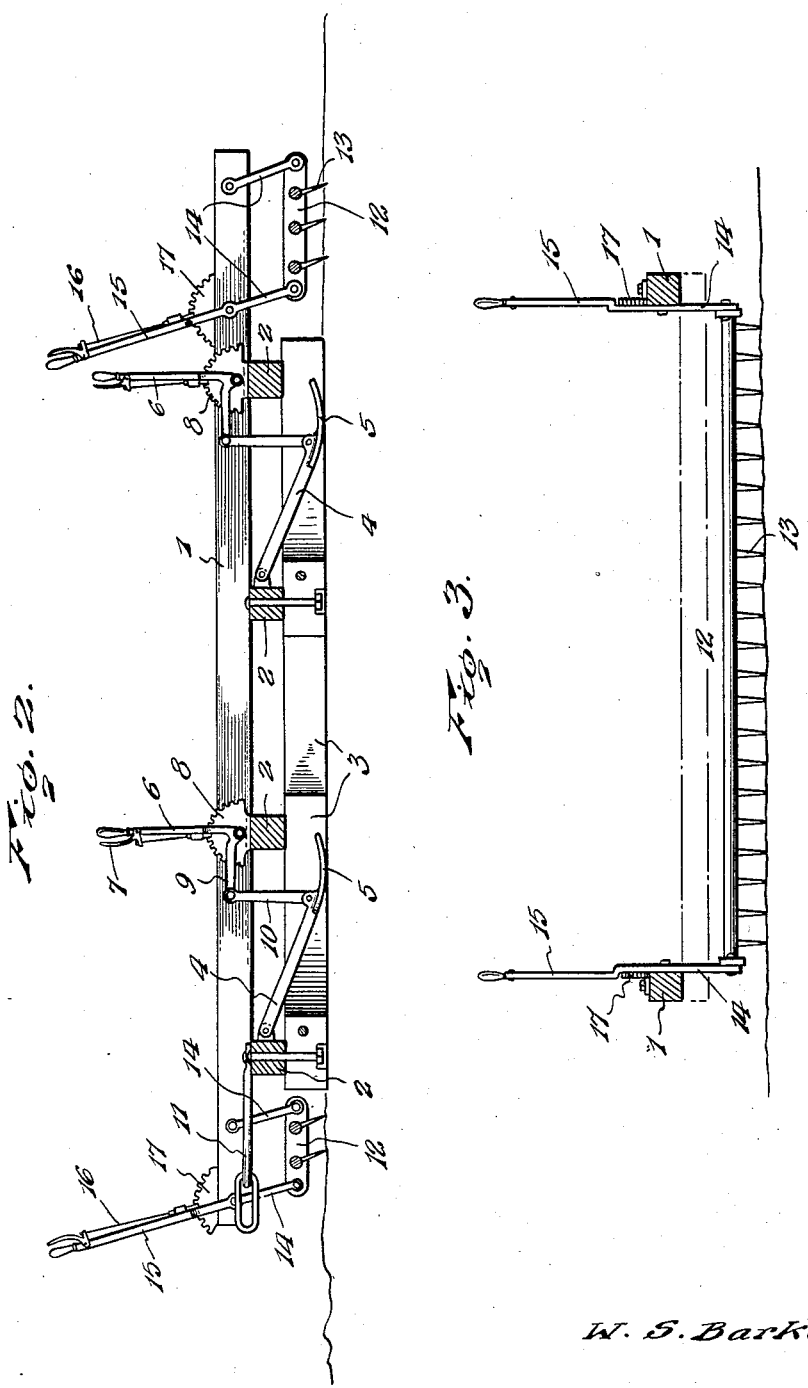
Inventor
W. S. Barker.
By Lacey & Lacey, Attorney Patented June 3, 1930

1,760,894

UNITED STATES PATENT OFFICE

WILLIAM S. BARKER, OF PANA, ILLINOIS

AGRICULTURAL IMPLEMENT

Application filed February 29, 1928. Serial No. 258,077.

This invention relates to implements for preparing soil for planting and has for its object the provision of a simple machine of light draft by the use of which, as it is drawn over a field, all clods and lumps of dirt will be caused to move transversely of the line of travel in opposite directions alternately and by their impact with the elements of the implement will be broken up and pulverized and the surface soil left in a smooth fine mulch. The invention also has for its object the provision of means whereby the depth of penetration of the soil may be easily regulated and the working surfaces of the implement held out of contact with the soil when the implement is to be drawn over a road. Other objects of the invention will appear incidentally in the course of the following description.

In the accompanying drawings:

Fig. 2 is a longitudinal section on the line 2—2 of Fig. 1, and

Fig. 3 is a transverse section on the line 3—3 of Fig. 1.

Figure 1:
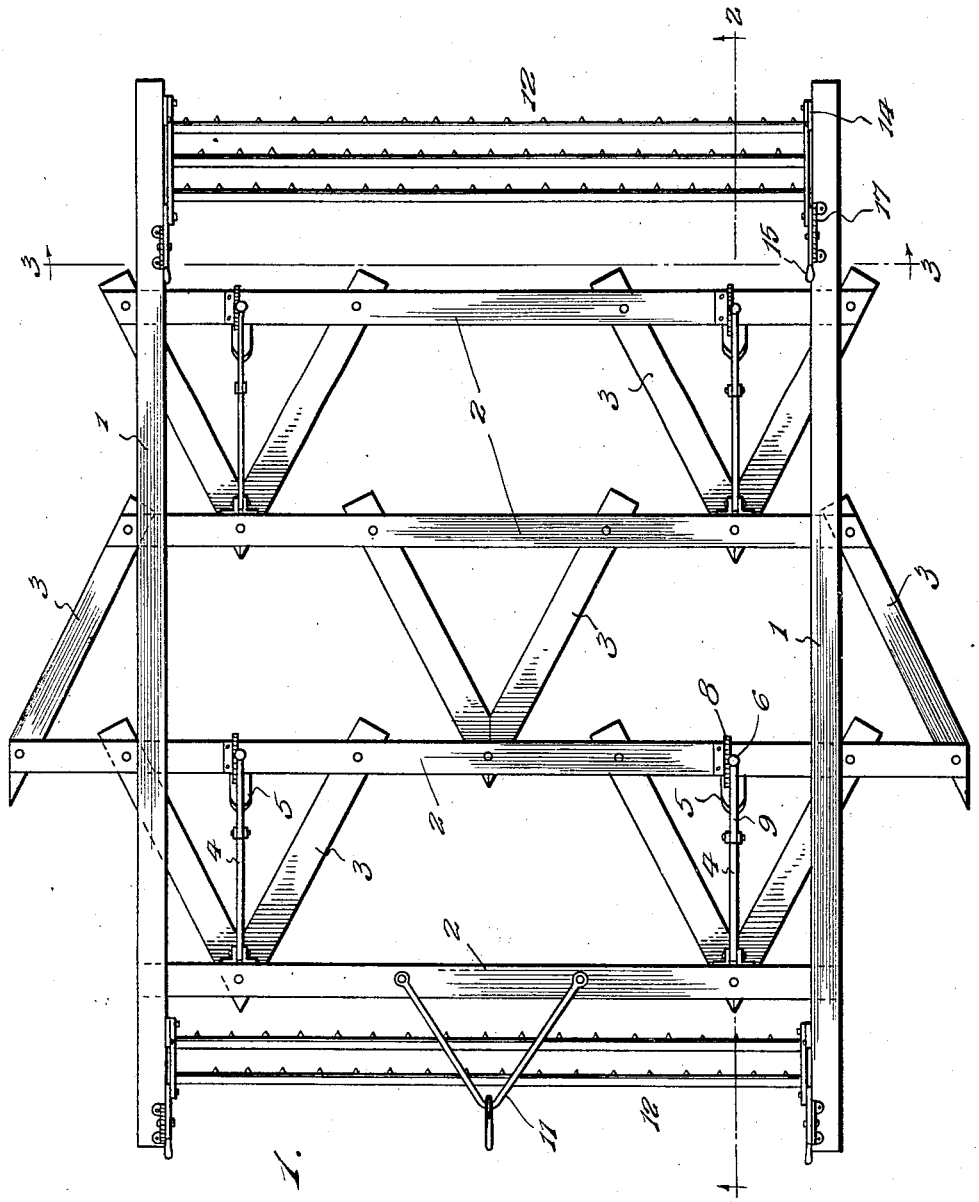
Figure 1 is a plan view of the implement embodying the invention.

In carrying out the invention, there is provided a frame consisting of side bars 1 and cross bars 2 rigidly secured upon the side bars. To the under sides of the several cross bars, I rigidly secure deflecting scrapers and leveling elements 3 consisting of obliquely disposed bars having flat surfaces, the bars being arranged in series transversely of the frame and also staggered longitudinally of the frame. It will also be noted that the intermediate cross bars 2 have their ends projecting beyond the adjacent side bars, and to these projecting ends scraping and leveling deflecting elements are secured, these elements being arranged to converge rearwardly so that any clods or loose soil which may be in the paths of the same will be turned inwardly under the frame. It will also be noted that between the side bars the deflecting elements are arranged in pairs which diverge rearwardly with the front ends of the members of each pair secured together so that there are developed V-shaped deflecting and leveling shoes or runners which are adapted to rest upon the surface of the ground and readily enter the loose surface soil and spread the same in opposite directions. It will also be noted that the outer member of one V-shaped element is disposed at the rear of the inner member of a preceding V-shaped element so that, as the implement is drawn over the field, the clods and loose soil will be deflected alternately in opposite directions with the result that the clods will be very completely broken up and spread over the surface which will be left in a smooth condition.

Pivotally mounted upon some of the cross bars 2 are levers or arms 4 which are equipped at their rear free ends with shoes or runners 5 adapted to rest upon the surface of the ground. Mounted upon the cross bars at the rear of the bars to which the arms 4 are pivoted are hand levers 6 equipped with latches 7 cooperating with holding racks 8 upon the bars in a well-known manner. Each hand lever carries a forwardly projecting arm 9 to which is pivoted a link 10 which, in turn, depends from said arm and is pivoted to the arm 4 adjacent the rear end of the same. By properly setting the hand levers, the shoes 5 may be caused to run in the plane of the lower surfaces of the several spreading and deflecting elements or to be disposed below said plane whereby the loose clods and surface soil may be penetrated more or less deeply as may be desired. It will also be noted that, if the shoes be set at the lower limits of their movement, the implement will be supported entirely out of contact with the ground surface and may be then readily drawn over a road without causing any damage thereto.

The implement is equipped with a clevis or other draft device 11 which may be secured in any approved manner to the front cross bar 2.

It is intended that the surface soil be harrowed or cultivated at the same time that the clods are broken and spread. To this end, I provide harrows 12 at the front and rear ends of the implement which harrows or cultivators may be equipped with blades or teeth 13 of any approved form. The harrows are supported by parallel links 14 pivoted at their lower ends to the harrow frame and at their upper ends to the adjacent side bars 1 of the frame and the forward link is extended upwardly to constitute a hand lever 15 equipped with a latch 16 cooperating with a holding rack 17. By this arrangement the harrows may be easily set to run at a desired depth and the harrow frame will always be supported in parallelism with the main frame.

From the foregoing description, taken in connection with the accompanying drawings, it will be seen that I have provided an exceedingly simple and inexpensive implement by the use of which surface soil will be very completely broken up and pulverized and left in a smooth condition.

Having thus described the invention, I claim:

1. An agricultural implement comprising a main frame, soil-deflecting elements secured to the under side of the frame and consisting of rigid rearwardly diverging bars, pivotally mounted arms carried by the frame and disposed on the medial longitudinal lines of the deflecting elements, shoes at the rear free ends of said arms, hand levers mounted on the frame above the rear ends of said arms, and link connections between the respective hand levers and the rear ends of the pivoted arms whereby to adjust the shoes.

2. An agricultural implement comprising a frame, soil-deflecting elements rigidly secured to the under side of the frame, vertically adjustable supports for the frame whereby the deflecting elements may be held to or from the ground, harrows at the front and rear ends of the frame, and parallel links suspending the harrows from the frame.

In testimony whereof I affix my signature.

WILLIAM S. BARKER. [L. S.]